United States Patent
Kropp

(10) Patent No.: US 6,315,463 B1
(45) Date of Patent: Nov. 13, 2001

(54) METHOD FOR PRODUCTION OF AN OPTOELECTRONIC FEMALE CONNECTOR ELEMENT, AND AN OPTOELECTRONIC CONNECTOR

(75) Inventor: Jörg-Reinhardt Kropp, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/536,172

(22) Filed: Mar. 27, 2000

Related U.S. Application Data

(63) Continuation of application No. PCT/DE98/02456, filed on Aug. 21, 1998.

(51) Int. Cl.⁷ .................................................. G02B 6/36
(52) U.S. Cl. ................................. 385/88; 385/89; 385/92; 385/94
(58) Field of Search .................................. 385/88, 89, 90, 385/91, 92, 94

(56) References Cited

U.S. PATENT DOCUMENTS

| | | | |
|---|---|---|---|
| 3,704,996 | * 12/1972 | Borner et al. | 350/96 |
| 5,367,593 | 11/1994 | Lebby et al. | |
| 5,715,338 | * 2/1998 | Sjolinder et al. | 385/14 |
| 5,818,990 | * 10/1998 | Steijer et al. | 385/49 |
| 6,034,808 | * 3/2000 | Isaksson | 359/245 |

FOREIGN PATENT DOCUMENTS

| | | |
|---|---|---|
| 41 14 156 A1 | 11/1992 | (DE) . |
| 43 00 652 C1 | 3/1994 | (DE) . |
| 0 458 608 A1 | 11/1991 | (EP) . |
| 0 522 417 A1 | 1/1993 | (EP) . |
| 0 573 941 A1 | 12/1993 | (EP) . |
| 0 699 932 A1 | 3/1996 | (EP) . |
| 2 245 082 A | 12/1991 | (GB) . |

OTHER PUBLICATIONS

Japanese Patent Abstract No. 58111008 (Kenichi), dated Jul. 1, 1983.
Japanese Patent Abstract No. 08110434 (Kazuya), dated Apr. 30, 1996.

* cited by examiner

Primary Examiner—Rodney Bovernick
Assistant Examiner—Sung Pak
(74) Attorney, Agent, or Firm—Herbert L. Lerner; Laurence A. Greenberg; Werner H. Stemer

(57) ABSTRACT

A method for producing of an electrooptical female connector element for an optical male connector of an electrooptical plug connector. In order to allow such a method to be carried out cost-effectively, a mounting module is used during the production of the female connector element. The mounting module is provided with alignment pins disposed on an end face, facing the male connector, in such a way that it corresponds to a configuration of alignment openings in the male connector. A component support having an electrooptical component with optical transducer elements is fitted on the end face of the mounting module, in a configuration corresponding to the optical conductor ends of the male connector. Once the male connector has been joined to the mounting module and the transducer elements have been actuated electrically, the component support is aligned to a position of maximum optical coupling. The component support is fixed in this position; a plastic encapsulation process is then carried out after removal of the male connector.

10 Claims, 2 Drawing Sheets

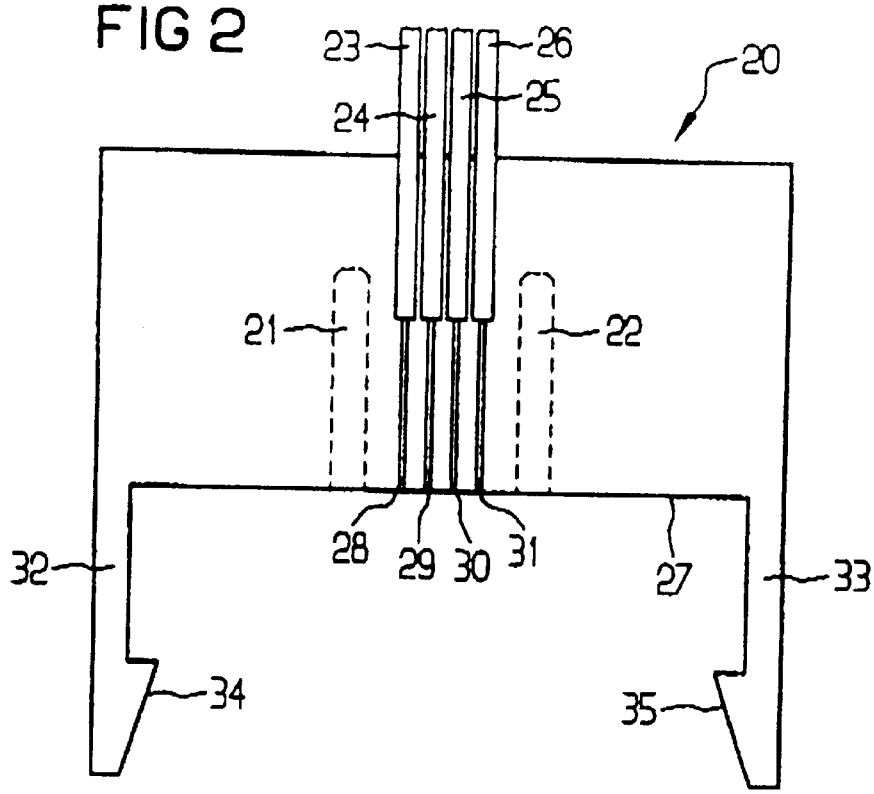
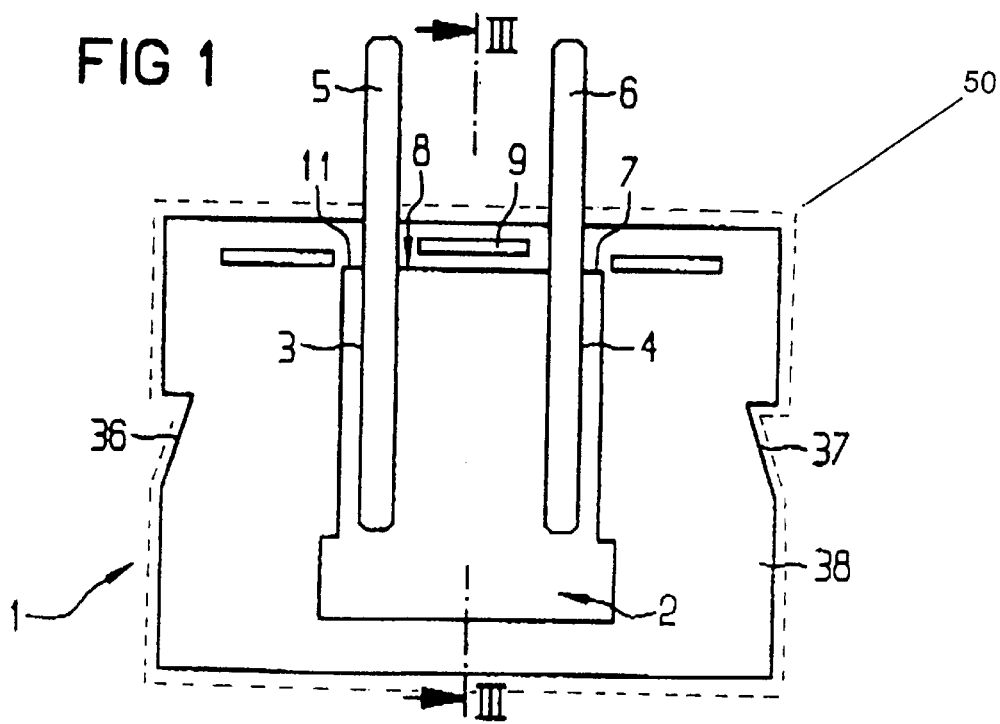

METHOD FOR PRODUCTION OF AN OPTOELECTRONIC FEMALE CONNECTOR ELEMENT, AND AN OPTOELECTRONIC CONNECTOR

CROSS-REFERENCE TO RELATED APPLICATION

This is a continuation of copending International Application PCT/DE98/02456, filed Aug. 21, 1998, which designated the United States.

BACKGROUND OF THE INVENTION

Field of the Invention

U.S. Pat. No. 5,367,593 discloses a method for producing an optoelectronic female connector element for an optical male connector of an optoelectronic plug connector, in which a mounting block having alignment openings and ends of grooves on the end face facing the male connector is used to produce the female connector element. The grooves are provided in a configuration corresponding to the optical conductor ends of the optical male connector and extend as far as a pit in the mounting block. A component support having an integrated circuit and an optoelectronic component is located in the pit. When the configuration is inserted into the pit in the mounting block, the optical transducer elements of the optoelectronic component are aligned with the inner ends of the grooves which, after being filled with a suitable plastic, form optical conductors.

SUMMARY OF THE INVENTION

It is accordingly an object of the invention to provide a method for the production of an optoelectronic female connector element, and an optoelectronic connector, which overcome the above-mentioned disadvantages of the prior art methods and devices of this general type, which can be carried out with comparatively little effort while achieving optimum coupling between the optoelectronic transducer elements in the female connector element and the optical components in the male connector.

With the foregoing and other objects in view there is provided, in accordance with the invention, a method for producing an optoelectronic female connector element for an optical male connector of an optoelectronic plug connector, which includes:

providing a mounting block having an end face with alignment pins projecting out from the end face and facing the optical male connector;

fitting a component support having an optoelectronic component with optoelectronic transducer elements to the end face of the mounting block;

guiding the mounting block toward an inner contact face of the optical male connector, with the alignment pins being inserted into alignment openings formed in the optical male connector;

electrically actuating the optoelectronic transducer elements of the optoelectronic component;

moving the component support on the end face facing the optical male connector to a position of maximum optical coupling to optical conductors of the optical male connector;

fixing the component support in the position of maximum coupling on the end face facing the optical male connector; and encapsulating the mounting block with plastic.

In order to achieve the object in the case of the method of the invention, the optoelectronic female connector element is used, in which the mounting block having alignment pins is provided in a configuration such that the alignment pins project out of an end face of the mounting block facing the male connector. The component support having the optoelectronic component is fitted to the end face of the mounting module. The mounting block is guided with respect to the contact face of the optical male connector, with the alignment pins being inserted into alignment openings in the optical male connector. The optoelectronic transducer elements of the optoelectronic component are electrically actuated, and the component support on the end face facing the male connector is moved to a position with maximum optical coupling to the optical conductors in the optical male connector. The component support is fixed in the position of maximum coupling on the end face facing the male connector, and the mounting block is encapsulated with plastic with the component support in the fixed position.

A major advantage of the method according to the invention is that it can be carried out comparatively easily. This is due to the fact that the component support is fitted together with the optoelectronic component on the end face of the mounting block facing the male connector, so that there is no need for a pit in the mounting block, and no grooves are required in the block either. The mounting block in the method according to the invention is essentially cuboid. A further important advantage is that a plug connector with particularly good optical coupling can be obtained, since the component support of the female connector element is positioned on the mounting block, with respect to the male connector, during the production process such that a position of maximum optical coupling is achieved between the optoelectronic transducer elements in the female connector and the optical components in the male connector. The production process according to the invention is not continued and completed until the component support has reached this position on the mounting block, so that an optoelectronic plug connector can be obtained in this way which is optimally configured with regard to the optical coupling and with regard to the feasibility of mechanical connection.

When the method according to the invention is being carried out, an inner opening in the component support is pushed onto the pins. The component support is thus initially positioned, and a simplified production process is carried out.

When the method according to the invention is carried out, the mounting block is advantageously guided with respect to the contact face of the optical male connector, while maintaining a predetermined separation, in order to hold the component support such that it can be moved on the mounting block and can be optically optimally aligned with respect to the optoelectronic transducer elements in the female connector element. The predetermined separation can be achieved in an advantageous manner by using appropriately dimensioned spacing pieces or by spacing elements on the component support.

The component support is advantageously fixed in the position of optimum optical coupling on the mounting block by bonding, soldering or welding. An adhesive that is cured by light is advantageously used as the adhesive in this case.

In one advantageous embodiment of the method according to the invention, the mounting block is encapsulated with a transparent plastic, at least in the region of the component support, thus producing external encapsulation. The encapsulation ensures protection against environmental influences and allows the light from the embedded optoelectronic transducer elements on the component support to reach the optical components in the male connector, when joined together.

During the process of encapsulating the mounting block, the mounting block is advantageously encapsulated with the plastic in a mold whose internal contour corresponds to the external contour of the male connector. For example, this allows recesses to be provided without any difficulties, in which locking catches of a latching device of the male connector can engage when joined together.

The invention furthermore relates to an optoelectronic plug connector having an optical male connector which, on its contact face, has ends of optical conductors as well as alignment elements located side by side. The plug connector further has an optoelectronic female connector element which, on its contact face, has alignment parts which interact with the alignment elements and is configured with the light receiving elements of its optoelectronic component aligned in the female connector element such that the light which emerges from the ends of the optical conductors falls on the light receiving elements.

Such a plug connector is described in Published, European Patent Application EP 0 699 932 A1. In this known plug connector, an optoelectronic female connector element has a mounting block whose end face facing the male connector is fitted with a component support having optoelectronic transducer elements; the component support is fitted with the mounting block to a printed circuit board. The mounting block has depressions in the sides to accommodate claw-like attachments on an optical male connector.

In order to provide the female connector element with a simple configuration for an optical plug connector while ensuring particularly good optical coupling then, according to the invention, the alignment parts are held as alignment pins in a mounting block in the female connector element, on its side facing the contact face of the male connector, the mounting block is fitted with a component support which surrounds the pins and is fitted with the optoelectronic component, and the mounting block, together with the component support and the optoelectronic component, are encapsulated with transparent plastic.

In an advantageous embodiment of the female connector element according to the invention, the plastic is transparent and has high optical transmission in the spectral band of the light that emerges from the ends of the optical conductors; it is thus protected against environmental influences.

Other features which are considered as characteristic for the invention are set forth in the appended claims.

Although the invention is illustrated and described herein as embodied in a method for the production of an optoelectronic female connector element, and an optoelectronic connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, sectional view through an exemplary embodiment of an electrooptical female connector produced according to method of the invention;

FIG. 2 is a sectional view of an exemplary embodiment of a male connector element that matches the female connector shown in FIG. 1;

DESCRIPTION OF THE PREFERRED EMBODIMENTS

Figure 3:
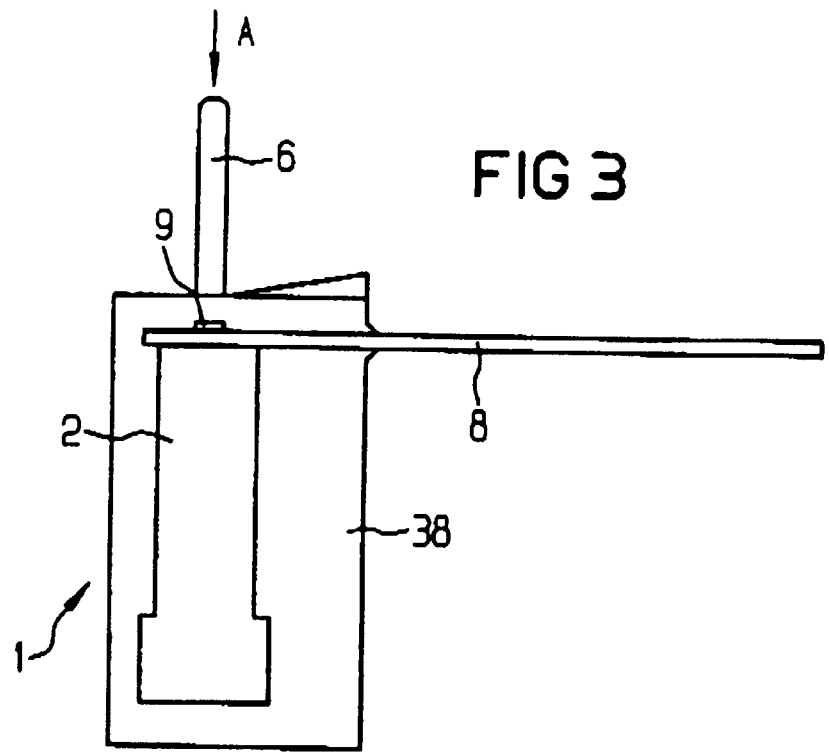
FIG. 3 is a sectional view through the exemplary embodiment shown in FIG. 1, taken along the line III—III.

In all the figures of the drawing, sub-features and integral parts that correspond to one another bear the same reference symbol in each case. Referring now to the figures of the drawings in detail and first, particularly, to FIG. 1 thereof, there is shown an optoelectronic female connector element 1 containing a mounting block 2. The mounting block 2 is provided with blind holes 3 and 4 to accommodate alignment parts in the form of pins 5 and 6. A component support 8 is fitted to an end face 7 of the mounting block 2 facing a male connector 20 (see FIG. 2) and is, for example, in the form of a printed circuit board 8 or a so-called leadframe 8 (see FIG. 3). An optoelectronic component 9, for example, having optoelectronic transducer elements 9a, such as VCSEL elements or photodiodes, is located on the component support 8.

Figure 4:
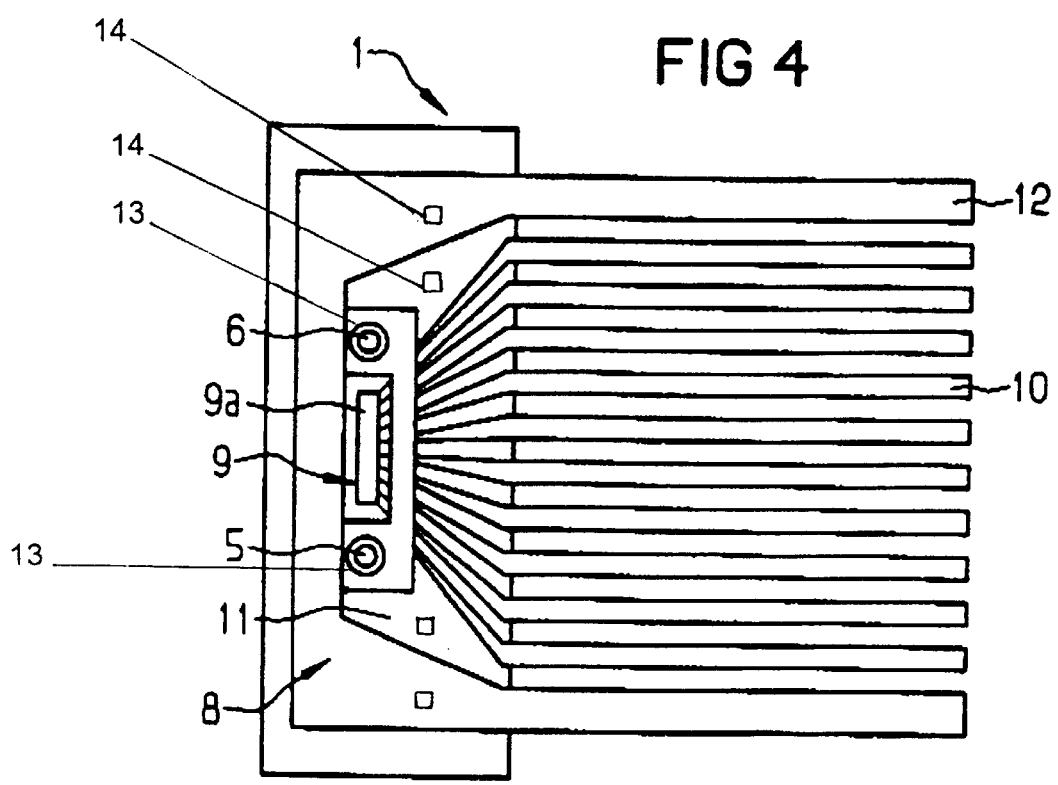
FIG. 4 is a plan view of the same exemplary embodiment of the electrooptical female connector.

As can be seen in particular from FIG. 4, apart from the transducer elements 9a, there are also conductor tracks 10 on the component support 8, which lead to non-illustrated external connections of the optoelectronic female connector element 1. The conductor tracks 10 are connected to the transducer elements 9 via bonding wires 11, as can likewise be seen in FIG. 4. FIG. 4 also shows that the component support 8 is provided with relatively large internal openings 13 in the region of the pins 5 and 6. In addition, the component support 8 has an outer frame 12.

It is intended to be possible to join the female connector element 1 as shown in FIGS. 1, 3 and 4 to the optical male connector 20 to form an optoelectronic plug connector. The male connector 20 illustrated in FIG. 2 has guide elements in its interior, which, bearing in mind the configuration of the alignment parts as the alignment pins 5 and 6 are configured as alignment openings 21 and 22 to accommodate free ends of the alignment pins 5 and 6. The male connector 20 also contains, as optical components, optical conductors 23, 24, 25 and 26, which end at terminations 28, 29, 30 and 31 on an inner contact face 27 of the male connector 20. The transducer elements 9 are physically disposed on the component support 8 taking into account the configuration of the terminations 28 to 31 of the optical conductors 23 to 26 of the male connector 20.

The male connector 20 is provided with locking catches 34 and 35 on mutually opposite tongues 32 and 33. The locking catches 34 and 35 engage in latching depressions 36 and 37 formed in a plastic encapsulation 38 of the mounting block 2 of the female connector element 1 when the male connector 20 is connected to the female connector element 1 (see FIG. 1), and thus hold the male connector 20 firmly on the female connector element 1.

During the process of producing the female connector element 1 illustrated in FIGS. 1, 3 and 4, the mounting block 2 is first provided with the blind holes 3 and 4 in a physical configuration as governed by the guide elements 21 and 22 on the male connector 20. After this, the alignment pins 5 and 6 are inserted into the blind holes 3 and 4. The opening 13 in the component support 8 is then pushed, from an upper side in FIG. 1, over the pins 5 and 6 (see, in particular, FIG. 4) and is placed against the end face 7 of the mounting block 2. The male connector 20 is then pushed onto the mounting block 2 in such a way that its alignment openings 21 and 22 hold the alignment pins 5 and 6 and at the same time maintain a separation between the end face 7 of the mounting block 2 facing the male connector and the end face 27 of the male connector 20 due to removable spacing elements 14. The male connector 20 and the mounting block 2 are pushed against one another and, in this state, the component support 8 is aligned with respect to the male connector 20 in such a way that, when the transducer elements 9a are electrically actuated, maximum optical coupling is achieved via the conductor tracks 10 on the component support 8 and observing the optical signals at the outer ends (which are not shown in FIG. 2) of the optical conductors 23 to 26. The component support 8 is then fixed in a position of maximum optical coupling on the end face 7 of the mounting module 2 facing the male connector 20, for example by introducing an adhesive, which is cured by light, from the side, and then removing the male connector 20 from the mounting block 2.

The mounting block 2 is then provided with the transparent plastic encapsulation 38 in a mold 50 (shown in dashed lines) having an internal contour which corresponds to an internal contour of the male connector 20 in the region of the inner contact face 27. The plastic encapsulation process is carried out using a transparent plastic, whose maximum transmission advantageously occurs in the spectral band in which signals will subsequently be transmitted via the optoelectronic female connector element 1. The latching depressions 36 and 37 are also formed in the encapsulation. The transducer elements 9a in the female connector element 1 are thus optimally protected against external environmental influences, and optimum optical coupling is achieved when the male connector 20 and the female connector element 1 are subsequently joined together to form an optical plug connection.

I claim:

1. A method for producing an optoelectronic female connector element for an optical male connector of an optoelectronic plug connector, which comprises:

providing a mounting block having an end face with alignment pins projecting out from the end face and facing the optical male connector;

fitting a component support having an optoelectronic component with optoelectronic transducer elements to the end face of the mounting block;

guiding the mounting block toward an inner contact face of the optical male connector, with the alignment pins being inserted into alignment openings formed in the optical male connector;

electrically actuating the optoelectronic transducer elements of the optoelectronic component;

moving the component support on the end face facing the optical male connector to a position of maximum optical coupling to optical conductors of the optical male connector;

fixing the component support in the position of maximum coupling on the end face facing the optical male connector; and encapsulating the mounting block with plastic.

2. The method according to claim 1, which comprises forming inner openings in the component support and pushing the inner openings over the alignment pins.

3. The method according to claim 1, which comprises fixing the component support to the end face of the mounting block by one of bonding, soldering and welding.

4. The method according to claim 1, which comprises encapsulating the mounting block with a transparent plastic, at least in a region of the component support.

5. The method according to claim 1, which comprises encapsulating the mounting block with a plastic in a mold whose internal contour is matched to an internal contour of the optical male connector.

6. The method according to claim 1, which comprises guiding the mounting block with respect to the inner contact face of the optical male connector while maintaining a predetermined separation between the mounting block and the optical male connector.

7. The method according to claim 6, which comprises placing spacing elements on the component support in order to maintain the predetermined separation.

8. The method according to claim 6, which comprises placing spacing elements between the mounting block and the optical male connector.

9. An optoelectronic plug connector, comprising:

an optical male connector having an inner contact face, optical conductors with ends located side by side disposed at said inner contact face, and alignment elements formed therein; and an optoelectronic female connector element, including:

a mounting block having a contact face facing said optical male connector and alignment pins projecting from said contact face;

a component support disposed on said mounting block and surrounding said alignment pins;

an optoelectronic component with optical transducer elements disposed on said component support, said alignment pins interacting with and disposed in said alignment elements of said optical male connector aligned with said optical transducer elements of said optoelectronic component such that light emerging from said ends of said optical conductors falls onto said optical transducer elements; and an encapsulation formed of an transparent plastic encapsulating said mounting block, said component support and said optoelectronic component.

10. The optoelectronic plug connector according to claim 9, wherein said transparent plastic has a high optical transmission in a spectral band of the light emerging from said ends of said optical conductors.

* * * * *